United States Patent
Bulgrin et al.

[19]

[11] Patent Number: 6,089,849
[45] Date of Patent: Jul. 18, 2000

[54] HYBRID INJECTION MOLDING MACHINE

[75] Inventors: Thomas C. Bulgrin, Columbia Station; Thomas H. Richards, Brunswick Hills; George L. Eterovich, Broadview Heights, all of Ohio

[73] Assignee: Van Dorn Demag Corporation, Strongsville, Ohio

[21] Appl. No.: 09/032,090

[22] Filed: Feb. 27, 1998

[51] Int. Cl.[7] .................................................. B29C 45/77
[52] U.S. Cl. ........................ 425/149; 264/40.7; 425/150; 425/170; 425/171; 425/589; 425/592
[58] Field of Search .................................... 425/135, 145, 425/149, 150, 169, 170, 171, 589, 592, 593, 451.5, 451.6; 264/40.3, 40.5, 40.7

[56] References Cited

U.S. PATENT DOCUMENTS

| | | |
|---|---|---|
| 3,911,677 | 10/1975 | Collins . |
| 4,904,913 | 2/1990 | Jones et al. . |
| 4,988,273 | 1/1991 | Faig et al. . |
| 5,052,909 | 10/1991 | Hertzer et al. . |
| 5,093,052 | 3/1992 | Wurl et al. . |
| 5,362,222 | 11/1994 | Faig et al. . |
| 5,417,558 | 5/1995 | Heindel et al. . |
| 5,456,870 | 10/1995 | Bulgrin . |
| 5,493,503 | 2/1996 | Richards et al. . |
| 5,513,115 | 4/1996 | Richards et al. . |
| 5,580,584 | 12/1996 | Mussler et al. . |
| 5,580,585 | 12/1996 | Holzschuh . |

FOREIGN PATENT DOCUMENTS 62-295606  11/1987  Japan .

OTHER PUBLICATIONS

Plastics World, Feb. 1986 Issue, entitled "IMM power use cut by 70%", p. 15.
"Baldor Sweodrive" paper entitled "Understanding Vector Control" (4 pages).
Paper entitled "AC Vector Drive Using Current Regulated PWM" by Frank N. Klein, Eaton Corporation (6 pages).
Article reprinted from PCIM Magazine, Jun. 1989 issue entitled "Vector Control Gives AC Drive The Edge Over DC" by Peter J. Walter and Frank N. Klein/Eaton Corporation (4 pages).
Battenfeld Brochure, Jun. 1990, entitled "Screw Drive with three–phase Servo Motor";.
Battenfeld Brochure, dated Sep. 1991, entitled "Injection Moulding Technology of the '90s".

*Primary Examiner*—Tim Heitbrink
*Attorney, Agent, or Firm*—Frank J. Nawalanic

[57] ABSTRACT

An energy efficient general purpose injection molding employs a hydraulic drive for injection and clamp machine functions and an electric drive for screw recovery. Both drives use AC "squirrel cage" induction motors under vector control. Speed command signals for the vector controls are generated by the machine's controller utilizing state transition and predictive signal techniques to account for motor and motor/pump response latencies. Hydraulic drive efficiency is improved by varying motor speed/pump output to match cycle requirements to retain hydraulic drive advantages for mold clamp and injection functions while improving the electric drive performance for screw recovery.

21 Claims, 9 Drawing Sheets

HYBRID INJECTION MOLDING MACHINE

This invention relates generally to injection molding machines and more particularly to the power transmission arrangement used in a general purpose injection molding machine.

INCORPORATION BY REFERENCE

Our prior patents listed below are incorporated herein by reference so that details related to the control systems illustrated therein need not be repeated in detail in this patent. The materials incorporated by reference herein do not, per se, form the present invention.

1) U.S. Pat. No. 5,513,115 to Richards et al., issued Apr. 30, 1996 and entitled "Clamp Control for Injection Molding Machine";
2) U.S. Pat. No. 5,493,503 to Richards et al., issued Feb. 20, 1996 and entitled "Clamp Control for Injection Molding Machine"; and
3) U.S. Pat. No. 5,456,870 to Bulgrin, issued Oct. 10, 1995 and entitled "Barrel Temperature State Controller for Injection Molding Machine".

BACKGROUND OF THE INVENTION

Any evaluation of a drive mechanism, whether hydraulic, pneumatic or electric, must first consider whether the drive is functionally acceptable for its intended use. Once that fundamental consideration has been addressed, other characteristics of the drive train, such as the purchase rice, the performance/reliability/maintenance costs and the operating (energy) costs must be evaluated.

An injection molding machine performs a molding cycle which includes the general steps or phases of clamp, inject, recover and eject. A general purpose injection molding machine must have the flexibility to perform the molding cycle for a wide variety of plastic materials, and more importantly, for a wide variety of molding applications. Limitations in the drive trains are oftentimes addressed, today, by complicated mold designs and extensive runner systems. For example if the machine can not deliver a long travel stroke at very fast speeds or high acceleration rates, an expensive multi-branch runner system for a mold with multiple feeders and gates is typically designed so that the injection stroke can be shortened and the injection speed slowed. In this manner an inferior drive train can be made to "work" and, most times, the machine end user is not aware of the limitations, even in competitive bidding situations.

Further complicating an evaluation of the drive trains are the tremendous improvements recently made in the control art which are able to mask or compensate to some extent for inherent weaknesses in a drive train. For example some control techniques developed in the precise, relatively low power/low torque machine tool and robotic industries have been literally copied into heavy duty injection molding machines exerting forces measured in tonnages. On the other hand, because improved control techniques are available for all drive trains and since the control is an inherent part of the drive train, itself, it simply must be evaluated along with and as part of the drive train.

Injection molding machines have traditionally been operated with hydraulic systems as their primary source of motive power. The most important step in the molding cycle, the injection step, is inherently suited to a fluid drive train system. A fluid drive train system using fluid pressure hydraulicly coupled to a prime mover has an innate ability to directly correlate to the movement of the injection molding material into the mold cavity. While relatively recent developments in velocity profiling have now standardized injection ram control, the hydraulic pressure exerted on the "ram" by the hydraulic drive directly corresponds to the pressure of the melt in the mold and is important for controlling or establishing the velocity profiling. Fundamentally then, a hydraulic system provides a direct measure of what is happening in the mold, whereas other drive systems, specifically an electric drive, can only provide an indirect measurement. This distinction becomes significant when considering mold packing. A hydraulic drive can easily maintain a packing pressure through direct pressure sensing. An electric drive has to use separate transducers to measure melt pressure (importantly affected by its position in the mold) and has to switch to torque control (and the torque has to be correlated to pressure which is not necessarily linear because of slip in the drive) at slow or zero velocity where torque pulsations from the motor can adversely affect the molded part. In addition, there is a non-linear translation of forces before static friction is overcome and the mechanical coupling engages in the electric drive train. That static friction can be variable.

There are also fundamental differences between electric and hydraulic drive mechanisms in the speed and speed control during injection. Each drive train has some advantages and disadvantages in this regard. However, for reasons discussed below, a hydraulic drive can linearly move the screw faster over a longer stroke than an electric drive.

In this regard, it must be noted that electric drive injection molding machines have been present in various forms for a number of years and have recently been promoted for general purpose injection molding machine applications to which this invention relates. Screw translation in an electric drive machine is typically accomplished by a ball screw coupling and recent developments in ball screw couplings have rendered such systems acceptable for a wide variety of plastics and plastic applications. Nevertheless, electric motors employing mechanical drive couplings (such as ball screw couplings) while initially quicker, cannot provide the rapid acceleration characteristics of a fluid drive train. As the science of molding plastics continues to evolve, the velocity profile spectrum of a fluid system will remain superior to that achieved by the mechanical couplings of electric drive machines. This feature coupled with the direct pressure sensing/control concept previously discussed provides hydraulic drive systems functional advantages over electric drive machines. Again the discussion is limited to general purpose injection molding machines which must possess a wide range of operating characteristics. Certain molding applications requiring relatively slow or medium speed injection strokes are adequately handled by electric drives. This is especially true with the advances in the control technology. However, the advances in control technology also apply to hydraulic drives and the consideration again reduces to the fundamental distinctions between the drive trains.

A similar functional analysis can be likewise applied to the clamping step of the molding process. Hydraulic clamp drives function like a press in that a high pressure is exerted to generate a high tonnage force and the valve simply closed to lock the mold halves together at a high pressure while pump pressure is released. The electric drive can only function in a similar manner by being left "on" rotating at "zero" velocity with maximum torque. This produces undesirable motor effects effectively limiting the electric drive to "toggle" clamp applications where the zero velocity characteristics of the motor are less noticeable.

Apart from functional considerations, when the other decision factors mentioned above are considered, hydraulic drives have advantages and disadvantages. Hydraulic drives are relatively inexpensive. They are tried and proven drives suitable for performing all the steps of a molding cycle and they have proven themselves rugged and reliable over the years. Further, in almost all instances, hydraulic fluid arrangements are present at the molding facility, i.e., setting and pulling cores. Any injection molding machine, whether electric or hydraulic, therefore must have the ability to handle hydraulics. Since the facilities use hydraulics and the machines must interface with hydraulic arrangements to perform the molding cycle, the environment is suited to hydraulic drive trains on the machine.

There are disadvantages however. Hydraulic oil is subject to dirt and contamination and requires filtering and maintenance and, in addition, has a potential for oil leakage. In addition, the system must employ heat enchangers and coolers to maintain the oil temperature relatively constant because, as generally known, variations in oil temperature produce variations in the drive which, in turn, have to be compensated for by the control system. However, the control systems have made dramatic improvements in recent years to compensate for such variations so that all of these "disadvantages" associated with the hydraulic drive are insignificant.

The principle disadvantage of the hydraulic drive in an injection molding machine is simply that it uses more energy than an electric drive. The energy cost to drive the electric motor powering the pump(s) is higher in a hydraulic drive than that of an electric drive because the electric drive only actuates the motor at the speed and power necessary to perform the molding step required at any given time in the molding cycle. In marked contrast, the motor is always driving the pump(s) in a hydraulic drive. In fact, some slight flow should be present in a hydraulic drive to maintain system heat.

Typically the molding machine's constant velocity pump (s) directs its fluid output to various hydraulic actuators on the machine through a proportioning valve which is variably opened or closed depending on the machine demand. Alternatively, a variable volume pump is used in lieu of the proportioning valve/constant delivery pump. The motor driving the pump powers the pump at a speed and torque necessary for the pump to deliver fluid flow and pressure on demand vis-a-vis the proportioning valve (or a functionally similar arrangement on the variable flow pump). When high pressure/flow is not required, the pump simply recirculates the fluid to a sump. The motor speed is directly proportional to energy usage. Because the pump must deliver power on demand, the motor is typically rotated at a high constant speed to make sure the pump can deliver the power. Because the pump(s) are idle during portions of the molding cycle, the power is simply recirculating fluid from and to the sump thus increasing the energy operating costs of the machine.

The prior art has long recognized this problem and has made attempts to control the speed of the motor to match the pump requirements dictated by the molding cycle. In concept, this is a viable approach which not only reduces energy usage by the motor but also reduces heat generated by the fluid. This concept was realized in Collins U.S. Pat. No. 3,911,677 but addressed through a series of on-off switches to a DC motor, obviously a brush type, vis-a-vis an interface unit not acceptable in today's environment. A more recent improvement is disclosed in Jones et al. U.S. Pat. No. 4,904,913 and an add-on device functionally similar to Jones is disclosed in the February, 1986 issue of *Plastics World* in an article entitled "IMM Power Use Cut by 70%" (p. 15). Such systems, while advanced over Collins, still use a set value for a machine function at which the machine has to be separately programmed and at which the motor is ramped. In Holzschuh U.S. Pat. No. 5,580,585, the concept of varying motor speed between set limits is also disclosed with a motor described as a steplessly regulated motor and then further stated to be a vector controlled motor. Like Jones and Collins, set signals are simply inputted to the motor. In Wurl U.S. Pat. No. 5,093,052 the systems disclosed in Collins, Jones and Holzschuh is materially improved on by the use of feedback to control pump outputs.

Japanese Patent Publication Number 63053302, dated Jul. 3, 1988 shows integration of the machine control with the control of motor speed for driving the pump. The integration is done through analog circuits. In Hertzer et al. U.S. Pat. No. 5,052,909 the integration of the motor pump is accomplished through the machine control but in an arrangement driving a variable speed pump. In general summary, the prior art shows numerous attempts to reduce the energy used by the hydraulic drive of an injection molding machine by varying the speed of the motor driving the pump during the molding cycle. These techniques have only been partially successfully in reducing the energy operating costs of the injection molding machine to what is otherwise possible by the use of systems that are added onto the basic control system of the machine or require modifications to the basic control system, and in all instances ramp the motor to set values. That is given the response time of the system to supply high volume flow under pressure the defects in the speed variation systems disclosed in the prior art prevent the systems from being as energy efficient as otherwise possible.

As already noted, because the motor is actuated only when called upon to actuate a molding function in the molding cycle and because the power is supplied only at the amount required, an electric drive is more energy efficient than the hydraulic drives which constantly run the electric motor as described above. This inherent feature of an electric drive coupled with the advances in motor control technology has resulted in the recent introduction into the marketplace of a number of general purpose all electric injection molding machines.

Generally speaking, it has long been known to use DC brush type motors to power the drive of an injection molding machine, but such drives are not economical. First, a wound armature is needed. Second, brushes for such motors generate sparks and wear. Third, brush commutation produces low speed torque ripple or cogging.

More recently DC brushless motors have been commercialized for all electric drive injection molding machines as shown in Faig et al. U.S. Pat. No. 4,988,273. ("All electric" is actually a misnomer since a hydraulic system is almost always used for the ejection and/or core placement step of the molding cycle by "all electric" injection molding machines. As used throughout the specification, "all electric" is used in the conventional sense to describe an injection molding machine having electric motors for performing the injection, clamp and recover steps of the molding cycle.) The DC brushless motor eliminates the brushes in a ceramic magnet/wound stator arrangement with a Hall effect sensor or encoder to emulate the performance of the DC brush type motor. Unfortunately cogging and zero velocity pulsations are present due to the induced trapezoidal wave form requiring additional control techniques to minimize their adverse effects. This is discussed at some length in Faig U.S. Pat. No. 4,988,273. In addition, brushless motors are relatively expensive for large size applications typically employed in a general purpose injection molding machine.

The cogging and torque pulsations of the DC drive are inherently reduced by the sinusoidal currents resulting in an AC motor. Specifically, AC synchronous drives initially developed in the robotics field have been successfully applied for a number of years in all electric machines. The high precision demanded for machine tool and robotics application built into such drives makes them ideally suitable for precision molding machine applications. However, AC synchronous motors use rare earth magnets and are expensive. Because of their low inertia rotor, they are limited to small horsepower applications. As a result, AC synchronous motors have to be ganged for operating larger, general purpose injection molding machines. This significantly increases the cost of the drive.

AC induction motors have long been used for driving the pumps in an injection molding machine. The low cost of the "squirrel cage" motor coupled with its high torque capabilities have made such motors an obvious choice of the machine designer. The controls for AC induction motors have typically been limited to operate the motor at steady speeds, which, as noted above, fit well within the conventional pump arrangement of the injection molding machine.

With the development of vector control, the application for AC induction motor drives has been significantly expanded. This control technique is normally attributed to the work of the Siemen's inventor, Felix Blaschke in the early 1970's, who it is believed initially suggested, in one of his early patents, that the vector control drive for asynchronous motors could be used for an extruder. Despite Blaschke's early suggestion, it is only recently that vector control AC induction drives have been used in injection molding machines. Japanese Patent publication No. 1-135609 (Japanese application No. 62-295606) discloses the use of an AC vector control drive for performing the injection step by an injection molding machine using a switched delta motor connection to increase the operating ranges of the AC motor and produce a wider range of plastic products from the machine. A less sophisticated application of vector control is subsequently disclosed in Faig et al. U.S. Pat. No. 5,362,222. Faig shows a common, typical vector control/pwm inverter drive for performing all the functions of an injection molding machine, including but not limited to screw translation. The prior art has thus followed Blaschke's suggestion and has now implemented vector control for achieving screw translation in an injection molding machine despite its limitations as described above.

SUMMARY OF THE INVENTION

It is thus a principle object of the invention to provide a drive arrangement for a general purpose injection molding machine which uses energy more efficiently than conventional machines while the machine's functional performance is improved.

This object along with other features of the invention is achieved in an energy conserving hybrid injection molding machine which includes an injection arrangement for injecting molding material into the mold cavity of a mold by a screw member rotatably and translatably carried within a tubular barrel having an end in fluid communication with the mold cavity. A first drive train arrangement rotates the screw in the barrel. The first drive arrangement includes a first AC induction motor, a mechanical coupling connecting the AC induction motor with the screw and a vector control drive for variably controlling the operation of the first AC motor in accordance with a rotate command signal from the machine controller. A second drive train is provided for translating the screw in the barrel. The second drive includes a second AC induction motor, a hydraulic pump driven by the AC induction motor, a hydraulic coupling for translatably moving the screw within the barrel and a second vector control drive for variably controlling the operation of the second AC induction motor pursuant to an injection command signal from the machine controller whereby the energy utilization of the machine is significantly reduced because the high energy recover function of the molding cycle is efficiently performed by an electric drive while the energy utilization of the hydraulic drive, which is retained for its functional characteristics, is reduced because of the variable speed of the pump motor.

In accordance with another important feature of the invention, the second drive train arrangement includes an additional AC induction motor mechanically coupled to an additional pump, in turn, hydraulically coupled to the mold clamp for controlling the clamping phase of the molding cycle. The machine controller operates in a number of separate states, each of which develops variable control signals including command signals, and transitions from one state to another to sequence the machine through various phases of the molding cycle upon a sensed change in state of feedback signals. Significantly, feedback signals are used to cause the command signals to be initiated in advance of the transition to another state or molding phase to assure that the pump motors are operating at sufficient speed to generate adequate pump flow required to perform the molding phase whereby the idle speed of the pump motors can be significantly reduced for relatively long periods of time while the motor's speed can be timely incurred to produce pump flow on demand in a responsive manner.

In accordance with yet another important feature of the invention, pressure transducers sensing hydraulic back pressure on the screw and the clamp, which are conventionally used in the machine controller as feedback signals generating control signals for controlling clamp and injection speed, are also utilized as predictive sensor signals for generating command signals to the AC screw rotation motor whereby the motor is more responsive to recover commands than all electric drive machines which must use separate transducers to sense melt pressure during the recover phase of the molding cycle.

In accordance with yet another important feature of the invention, the hydraulic pump motors are controlled in actuation not only by predictive command signals based upon the latency of the pump response time but also by predictive command signals based upon the actuation time of the hydraulic valves permitting use of economical encoderless or senseless vector control drives lacking classic internal, closed loop speed control notwithstanding the longer response time of encoderless vector drives.

Generally, it is an object of the invention to provide vector controlled AC induction motors on a general purpose injection molding machine to achieve energy use efficiencies while improving or maintaining machine performance by utilizing 1) an AC vector controlled induction motor drive for screw recovery
   a) to avoid torque pulsations at low or zero velocity speeds which occurs if the AC induction drive were used for screw injection or mold clamp functions, and/or b) to drive the vector control by speed signals only thereby avoiding the need to develop control strategies implementing torque command signals and the inevitable hitch when the control switches from one mode of operation to the other, and/or c) to utilize pressure feedback signals from the hydraulic screw drive for developing backpressure signals to better control the recovery function of the screw, and/or d) to use state transition controls in combination with predictive sensor signals to better control the AC induction drive in a seamless manner and without the necessity of adding external closed loop controls to the drive, and/or e) to provide a low cost electric motor drive which is capable of using encoderless vector drives when the control drive art further develops the response time for such motors, and 2) an AC vector controlled induction motor with hydraulic coupling for clamp and injection to a) retain the characteristics of hydraulic drives in that i) pressure feedback system signals are developed to directly control and produce a responsive drive and ii) high linear acceleration characteristics of the drive are maintained, and/or b) utilize state transition controls with predictive sensor signal switching to allow lower motor speed during pump idle and precise boost time thus resulting in lesser energy usage than other variable speed motor drive designs, and/or c) utilize state transition controls with predictive sensor signals not only for the motor but also in combination with actuation of the hydraulic valves so that presently offered sensorless or encoderless AC vector controlled drives can be utilized to further reduce the cost of the machine, and/or d) to use in combination with inner and outer control loops and state transition, feed forward techniques such that modifications to conventional pump valving can be made to eliminate the proportioning valve without significantly reducing performance.

It is another object of the invention to provide in an injection molding machine a vector controlled AC induction motor to variably drive a pump which forms a hydraulic drive to achieve screw translation in an energy efficient manner while providing a vector controlled AC induction motor drive to directly rotate the screw in not only an energy efficient manner, but also in an improved controlled manner.

Another object of the invention is to provide an injection molding with a hybrid hydraulic/electric drive arrangement in which the drives are matched to specific molding steps in the molding cycle to achieve energy efficiencies and maximum machine performance.

Another object of the invention is to provide an injection molding machine with an electric drive arrangement to perform the recover step in the molding cycle while hydraulic drives perform other functions in the molding cycle to permit the machine to simultaneously perform recover and clamp functions without the addition of hydraulic circuits otherwise required to simultaneously perform recover and clamp functions in an all hydraulic drive machine.

Still yet another object of the invention is to generate the command signals controlling the motor speeds during each scan of each state by the machine controller whereby the AC induction motor drives are seamlessly integrated into the machine's control system in order to more closely match the flow requirements within that machine step.

Still yet another object of the invention is to provide an injection molding machine with a vector controlled AC induction pump motor for variably driving at least one pump on the machine with signals developed by the conventional control system using feed forward algorithms to eliminate the proportioning valve used in conventional hydraulic systems.

It is yet another object of the invention to provide in a general purpose injection molding machine a vector controlled AC motor drive for variably controlling the speed of a pump which is integrated into the control system of the machine to achieve variable pump output on demand during any step of the molding cycle.

Yet another specific object of the invention is to provide a vector controlled AC induction motor drive for screw recovery in an injection molding machine which can function with only open loop control for screw recovery obviating the need for closed outer loop control of the vector drive used in other injection molding machine applications.

Yet another specific object of the invention is to provide in an injection molding machine several vector controlled AC induction motors which use the same control signals now used in the machine control system to control the vector drives.

Yet another object of the invention is to provide an entirely conventional hydraulic drive injection molding machine with only a vector controlled AC induction motor for screw recovery as defined above.

Still another object of the invention is to provide an entirely conventional hydraulic drive injection molding machine including a conventional hydraulic motor for screw rotation in which all the pump motors are vector controlled AC induction motors driven by variable command signals in the manner described to achieve efficient energy use.

Still another object of the invention is to provide a hybrid hydraulic/electric drive train injection molding machine in which the hydraulic drive train has been retained to perform those machine functions in which pressure must be held and direct measurement of the pressure is used for machine control.

Still another object of the invention is to provide an economic, rugged and reliable drive system for a general purpose injection molding machine.

These and other objects, features and advantages of the present invention will become apparent to those skilled in the art upon a reading the Detailed Description of the Invention as set forth below taken together with the drawings which will be described in the next section.

DETAILED DESCRIPTION OF THE DRAWINGS

The invention may take physical form in certain parts and arrangement of parts, a preferred embodiment of which will be described in detail and illustrated in the accompanying drawings which form a part hereof of wherein:

FIG. 1 is a schematic representation of a portion of an injection molding machine;

FIGS. 2A and 2B taken together show a general control schematic of an injection molding machine;

Figure 5:
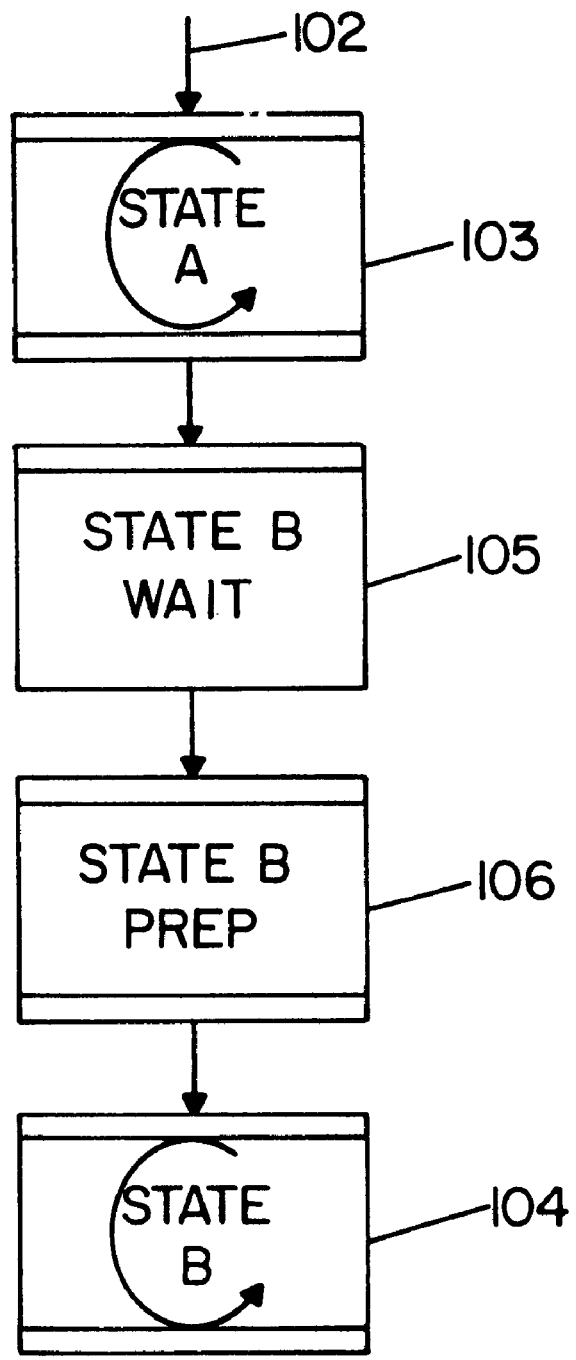
Figure 6:
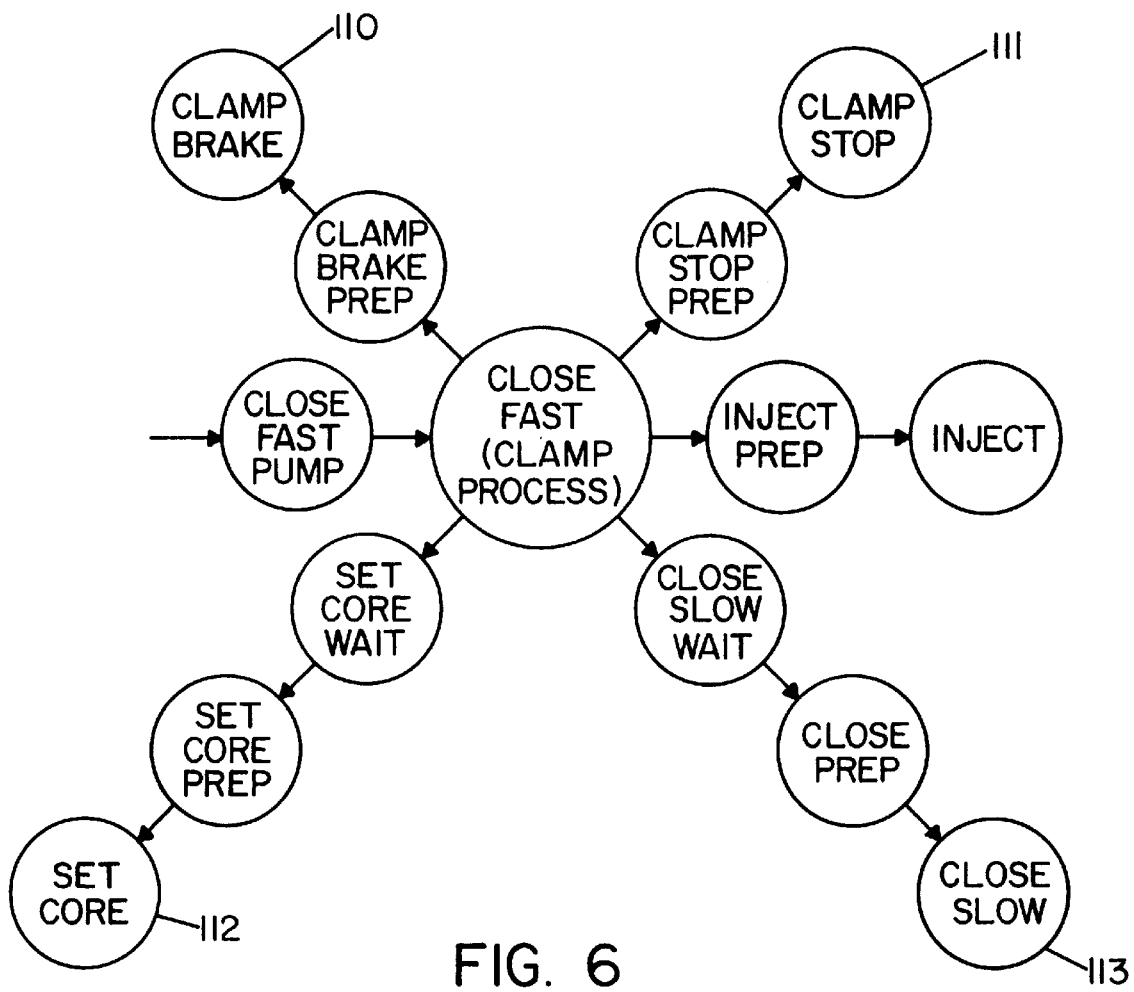
Figure 7:
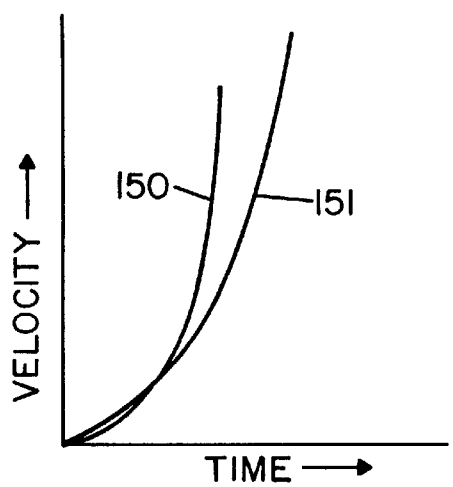
Figure 8:
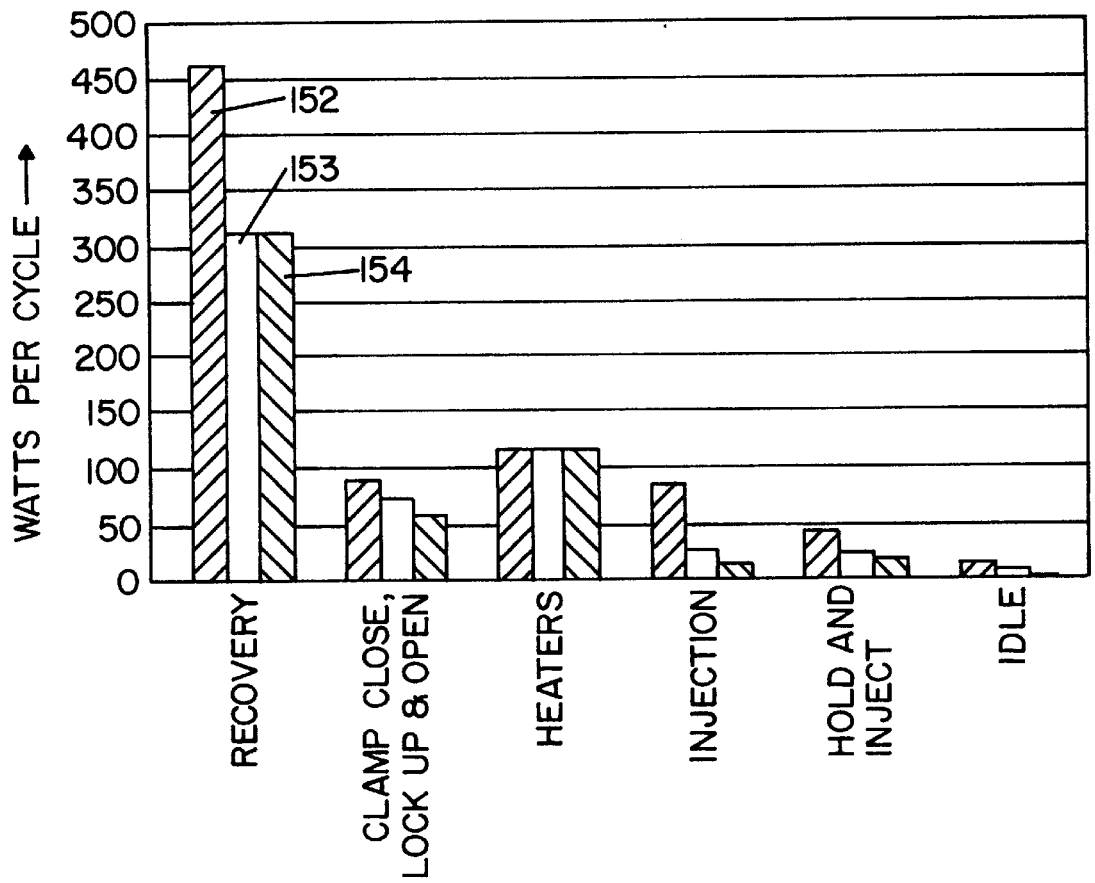
Figure 9:
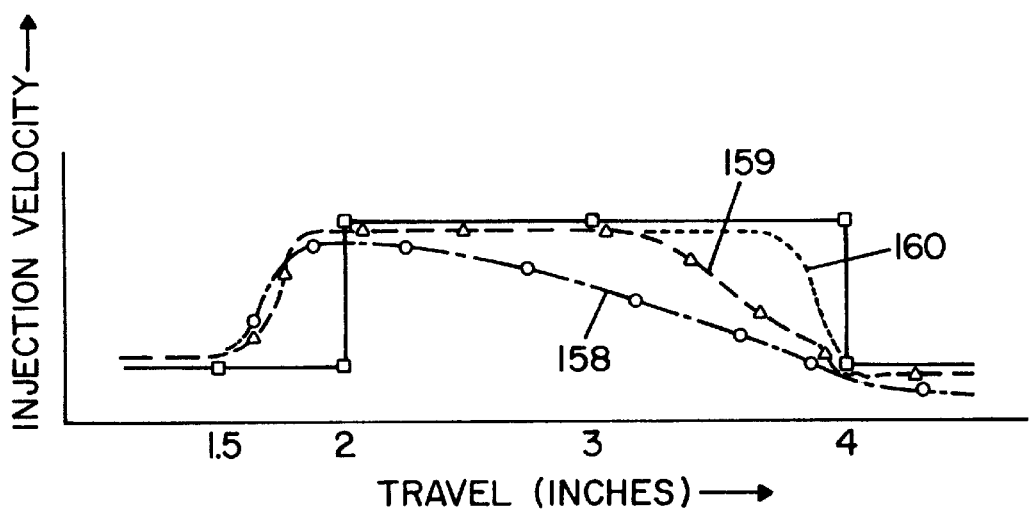

FIG. 5 is a general block diagram showing generally, the concept of state transition control used in the controller of the present invention and corresponds to FIG. 10 of U.S. Pat. Nos. 5,513,115 and 5,493,503;

FIG. 6 is a block diagram of a portion of the state transition logic used in the injection molding machine of the present invention and corresponds to FIG. 11 of U.S. Pat. Nos. 5,513,115 and 5,493,503;

FIG. 7 is a graph of speed versus time for electric and hydraulic drive systems;

FIG. 8 is a graph of energy usage by various drive systems of injection molding machines including that of the present invention; and, FIG. 9 are graphs of screw velocities plotted as a function of travel with various control techniques for set points.

DETAILED DESCRIPTION OF THE INVENTION

Figure 1:
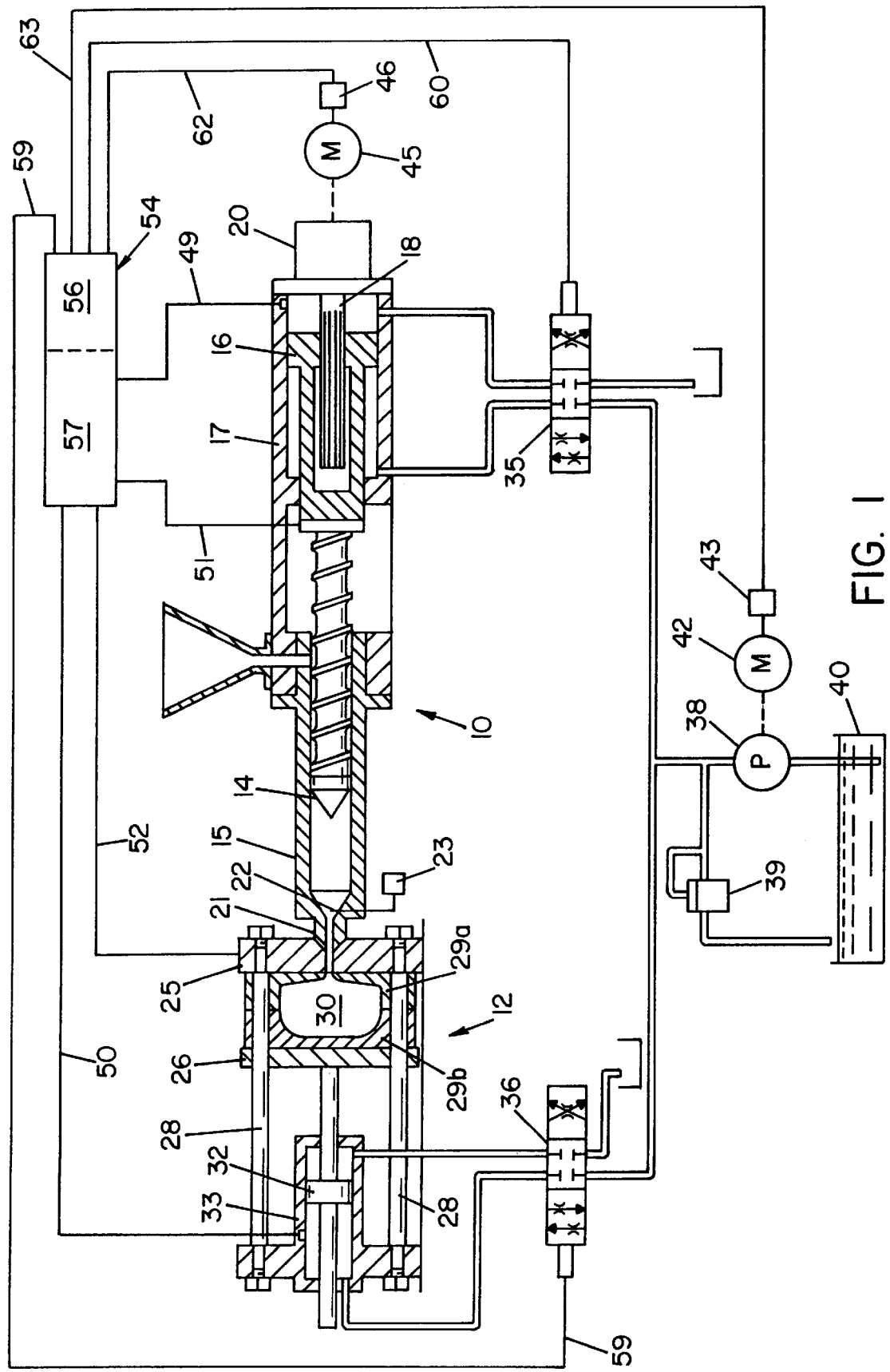

Referring now to the drawings wherein the showings are for the purpose of illustrating a preferred embodiment of the invention only and not for the purpose of limiting the same, there is shown in FIG. 1 a schematic, pictorial representation of an injection mechanism 10 and a clamp mechanism 12 conventionally used in an injection molding machine.

For terminology convenience and in order to avoid ambiguities, it should be understood that reference to "hydraulic drive" and "electric drive" and "drive systems" means the entire power transmission or drive train including the motor, its control, the coupling, etc. Reference to "vector control drive" or "vector drive" or "AC induction motor drive" means the control used to govern the operation of the motor.

Injection mechanism 10 includes a screw 14 translatably and rotatably disposed within a tubular barrel 15. Translation of screw 14 within barrel 15 is achieved by a hydraulic actuator or hydraulic coupling shown to include an injector piston 16 movable within a cylinder 17. Screw rotation occurs by rotation of drive shaft 18 secured to a mechanical coupling 20 which, in the preferred embodiment, is a gear box. For schematic illustration purposes, drive shaft 18 is shown splined to injector piston 16 so that injector piston 16 can slide within cylinder 17 to cause translation of screw 14 while the rotation of drive shaft 18 causes injector piston 16 to rotate screw 14.

Barrel 15 has an open end 21 in fluid communication with clamp mechanism 12. In the preferred embodiment, a shut off valve diagrammatically represented by reference numeral 22 actuated by a solenoid 23 is conventionally provided at open end 21 to selectively permit or prevent fluid communication of molding material within barrel 15 with clamp mechanism 12.

Clamp mechanism 12 includes a stationary platen 25 and a moveable platen 26 which moves along tie rods 28 extending therethrough. Mold sections 29a, 29b are mounted to stationary and movable platens 25, 26, respectively, to define a mold cavity 30 when in a mated relationship as shown. A hydraulic actuator or hydraulic coupling in the form of a clamp piston 32 disposed within a clamp cylinder 33 causes movable platen 26 to travel along tie rods 28 to part mold sections 29a, 29b and open the mold or to bring mold sections 29a, 29b into mated relationship and close the mold under pressure. Alternatively, clamp piston 32 can actuate a mechanical toggle linkage to close mold sections 29a, 29b. Not shown in FIG. 1 is an ejector hydraulic drive for moving the molded part from mold cavity 30 after the part has solidified and cooled nor is their shown a hydraulic actuated core setting mechanism for setting cores into mold cavity 30 prior to closing the mold and injecting molding material into mold cavity 30.

Movement of injector piston 16 is controlled by an injection directional proportioning valve 35. Similarly, movement of clamp piston 32 within clamp cylinder 33 is controlled by a clamp directional proportioning valve 36. Again, FIG. 1 is schematic. In actual operation, an injection manifold which includes, but is not limited to, valves controlling output of an injection pump(s) is typically provided and similarly a separate clamp manifold of valve is provided for controlling pressure and flow from a clamp pump(s). However, in each of these manifolds, a separate proportioning valve is used in the preferred embodiment. In the preferred embodiment, proportioning valves are flow controlled only. That is, pressure is controlled by regulating flow. It is customary for proportioning valves to separately regulate both pressure and flow. Because of high driving torque of the motor (discussed hereafter), pressure does not have to be separately controlled (other than limited by a conventional safety relief valve).

This arrangement allows high hydraulic pressure to be exerted to close mold sections 29a, 29b at which point clamp directional proportioning valve 36 moves to the position shown to trap the fluid at its high pressure. A similar result occurs with injection directional proportion valve 35. However, as the molding material cools in mold cavity 30 during packing, screw 14 will advance and pressure will dissipate causing valve 35 to open, etc.

A constant delivery pump 38 is provided for moving clamp piston 32 and injector piston 16 in a controlled manner vis-a-vis clamp valve 36 and injector valve 35. Pump 38 is provided with a conventional safety relief valve 39 connected to sump 40. Pump 38 is driven by a pump AC induction motor 42. At this point, the hydraulic arrangement as described above is conventional. In accordance with the invention, a vector control drive 43 is provided to variably drive AC pump motor 42 in a manner which will be described hereafter.

Similarly, driving mechanical coupling 20 is an AC induction motor hereafter referred to as rotate drive motor 45 which, in turn, is driven by a vector control drive 46.

There are several transducers mounted on the injection molding machine which develop signals indicative of the condition of the machine. These sensors includes a sensor measuring the pressure of the fluid acting on injector piston 16 developing an injection pressure sensor signal shown by reference numeral 49. Similarly, a pressure transducer develops a signal indicative of the pressure exerted on clamp piston 32 developing a clamp pressure signal on line 50. There are also transducers indicating the screw position and screw rotation or RPM. The screw position and rotation signals are transmitted on line indicated by reference numeral 51. Similarly, there is a clamp transducer generating a clamp position signal on line 52. The feedback signals described are inputted to a machine controller 54. The transducers are shown as separate instruments for explanatory purposes only. In practice and as understand by those skilled in the art, mold and ram transducers may be the same.

Machine controller 54 essentially comprises two units, namely, an operator station 56 and a programmable logic controller or PLC 57. Operator station 56 includes a display unit, either an LCD, EL or a CRT, visually displaying set up and machine conditions and a key pad or a key board into which the operator sets the mold cycle data he wants the machine to run at. PLC 57 contains a number of intelligent boards receiving feedback signals as described and input data from operator station 56 to generate control signals. Insofar as the general schematic FIG. 1 is concerned, the control signals generated by controller 54 include a valve clamp control signal on line 59 controlling operation of clamp valve 36. Similarly, an injection control signal is generated on line 60 controlling the operation of injection valve 35. Additionally, a rotate command signal is generated on line 62 to vector control drive 46 for controlling the speed of AC rotate motor 45. A pump motor command signal is generated by control 54 on pump command signal line 63 to vector control drive 43 controlling the speed of AC induction pump motor 42.

The molding cycle sequentially proceeds in stages or phases from mold closing to injection, packing, recovery, mold opening and eject. Command signals are developed by controller 54 to cause the machine to perform this sequenced molding cycle. Significantly, a number of motor command signals on lines 62, 63 for any step are outputted for each step. For example, the speed of pump motor 42 is not necessarily set to one value for the injection step. Instead, a number of commands are generated by controller 54 during the injection step causing the speed of motor 42 to vary the speed of constant discharge pump 38 so that sufficient fluid (and pressure) is supplied injection valve 35 to perform the injection step at any given time. Similarly, the speed of rotate motor 45 is variably changed through a series of command signals at millisecond time intervals generated by controller 54.

Figure 3:
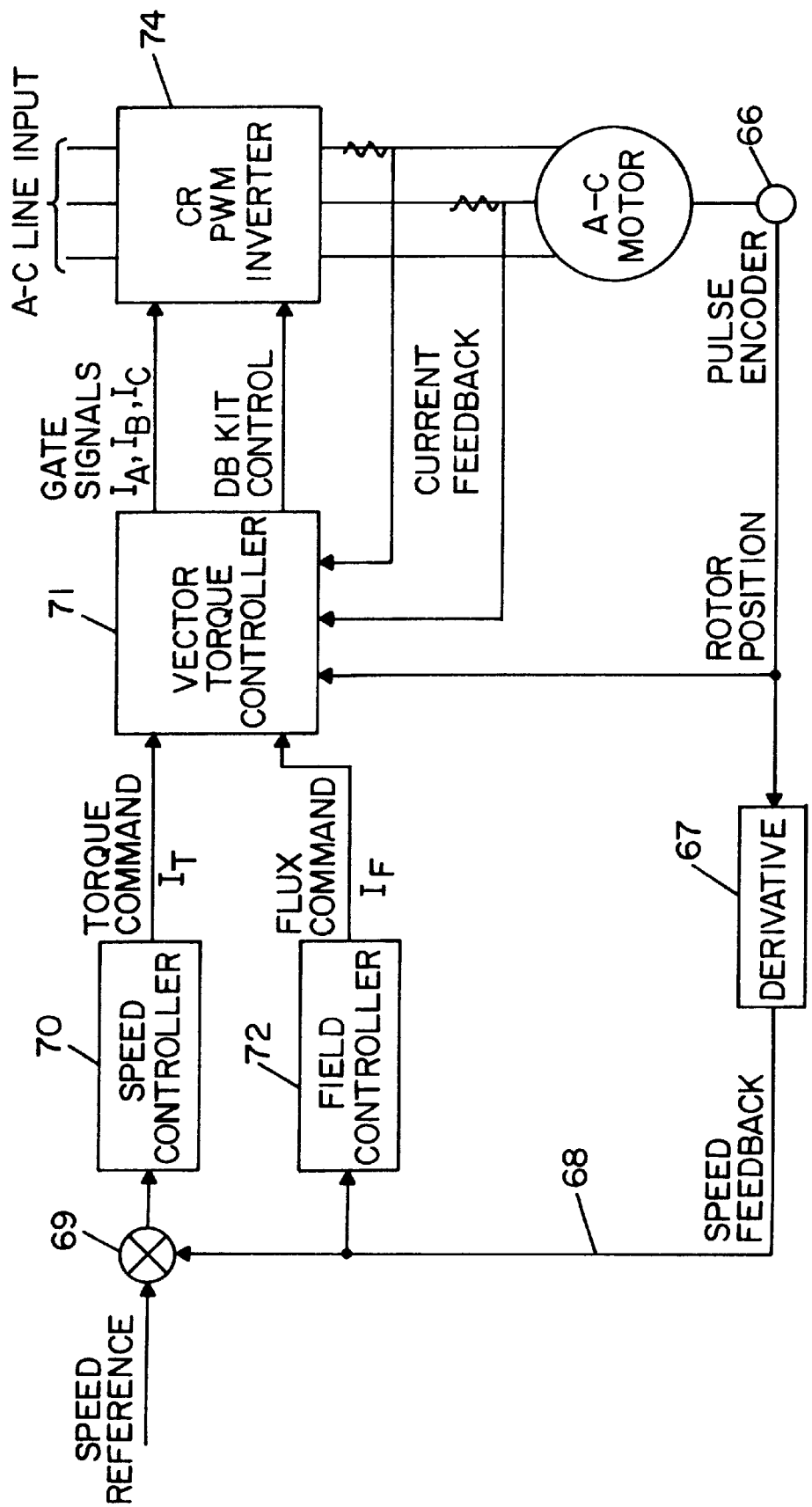
FIG. 3 is a general schematic of a vector control drive used in the invention and is prior art.

Referring now to FIG. 3, there is generally shown a conventional vector control drive. This conventional vector control drive is used as the drive for rotate motor 45 and pump motor 42 and indicated in FIG. 1 by schematic blocks designated 46 and 43, respectively. As is well known, vector control exerts such control over the AC motor that it performs like a DC motor. This is essentially accomplished by a flux vector algorithm(s) which decouples the magnetizing flux and torque component (or vectors) of the stator current. This decoupling was a breakthrough because it permitted a torque component of the current to be isolated. Reference can be had to the vector control articles cited in the "Other Publications" section in U.S. Pat. No. 5,362,222 for a more thorough description of vector control than that presented herein and to then prior art FIG. 7 of the '222 patent to show a conventional vector control implemented into an injection molding machine, incorporated by reference herein.

In the system of FIG. 3, a pulse tachometer or encoder 66 generates a rotor position and through a derivative block 67 provides a speed feedback designated by reference numeral on line 68 which forms a closed inner loop with a speed command signal 62 (or 63) generated by controller 54. The speed reference is summed at 69 and through algorithms in speed controller block 70 a torque command or torque reference current component, $I_T$, is generated and inputted to vector torque controller 71. The speed feedback is also utilized by algorithms in field orienter or field controller 72 to generate a magnetizing flux component of the stator current or flux command current $I_F$ which is also inputted to vector torque controller 71. Vector torque controller 71 utilizes the rotor position to maintain the spatial orientation of the rotor flux with respect to the torque producing current to generate gate signals $I_A$, $I_B$, $I_C$ which are inputted to a current regulated pulse width modulated inverter (CRPWM) 74 which produces pulse width modulated trigger signals. The trigger signals which are based on the vector drive calculations apply a controlled current (also designated $I_A$, $I_B$, $I_C$) to the stator windings of the AC motor for driving the AC motor at a controlled torque and speed.

Figure 3A:
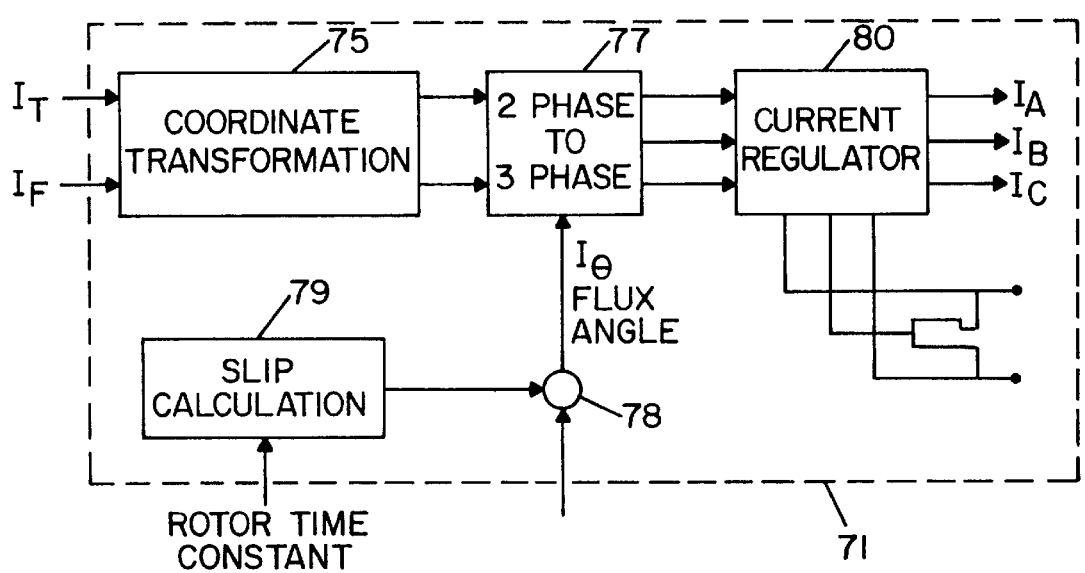
FIG. 3A is more detailed representation of the vector controller disclosed in FIG. 3 and is prior art.

Referring now to FIG. 3A, there is shown the basic components of vector torque controller 71 which uses an indirect field orientation system with CRPWM inverter 74. The magnetizing flux command signals $I_F$ and torque command signals $I_T$ which are three-phase signals are transformed into a two-phase, q and d axis, equivalent to reduce the number of system variables. The transformation to q,d two phase is indicated by coordinate transformation block 75. The spatial orientation of the rotor flux with respect to the torque producing current must be ascertained and is indirectly done by summing a rotor position signal (generated from pulse encoder 66) at summing block 78 with a slip position generated by slip calculator 79 to generate the rotor field angle or flux angle $I_θ$. The resulting independent currents can then be compared with relevant references to establish the respective errors of magnitude and position. An inverse transformation into three-phase at block 77 recovers information in stator reference frames.

It is of course understood that all the function blocks described for vector control drive 43 is performed by software under the control of a computer or CPU (not shown). Specifically, derivative block 67 calculating the speed feedback signal, field orienter 72, speed control 70, coordinate transformation 75, two to three-phase calculation 77, and slip calculation 79 are all under the control of CPU. Finally, current regulator 80 generates gate signal $I_A$, $I_B$, $I_C$ is inputted to a conventional CRPWM 74.

There are several points to be made with respect to FIG. 3 as applied to this invention. In the preferred embodiment, speed reference forms an inner closed loop within the control. It is sometimes conventional to provide an outer control loop where an external feedback speed (or torque) signal is compared with speed command signal (62 or 63) prior to summing through the inner loop with speed reference signal 68. This is not needed in the present invention because of the manner in which controller 54 of the present invention generates the command signal. The second point to note is that the command signal is a speed signal and not a torque signal. In this respect, the vector control operates by varying the torque current derived from the speed. That is, while the external signal is speed, the drive itself uses torque to control speed. It is of course possible to change the signal so that a torque signal is inputted to the vector control. Under speed control, the vector algorithms are set to produce maximum torque. In the invention for both recover and pump motor applications, maximum torque is desired in all instances. For pump motor applications, motor speed correlates to pump flow and motor torque correlates to fluid pressure. Maximum torque is desired so that only fluid flow needs to be controlled. Of course adjusting fluid flow through valves 35, 36 also adjusts pressure. However, separate control of fluid pressure by motor torque is not needed nor desired nor useful (except, of course, relief valve 39, needed for pressure limiting, safety related purposes). For recover, motor speed is not zero under load. Importantly, in the drive system of the invention, back pressure on the screw is achieved through hydraulic pressure on injector piston 16 unlike electric drive applications where the motor exerting screw pressure is also causing screw rotation. Because torque pulsations occurring at low speeds under load are not present, there is no need to generate torque command signals to try to alleviate the pulsations. A simpler, more efficient and effective operation results. Third, recent developments in vector control drives are now producing sensorless or encoderless vector drives. Specifically, pulse encoder 66 is eliminated to produce a less expensive drive. In such drives, the torque and flux producing algorithms are essentially modeled to the specific motor to which the drive is attached. The model predicts, based on the speed command signal, what the speed feedback signal would be in the inner loop and generates the stator currents accordingly. The response time of the sensorless vector drive is slower than that shown for the vector drive of FIG. 3. It must be appreciated, that when the command speed signal is inputted, the motor speed immediately begins to change. If the time to reach speed is longer than the desired control time, the drive is unacceptable. For this reason, present day sensorless drives are not acceptable for screw recovery. Should the drive control art continue to evolve to the point where the response time of future sensorless drives equals that achieved with today's internal closed loop drives, then such drives could be used in the screw rotate motor of the invention. However, in accordance with the invention, present day sensorless vector drives can be implemented for the motor pump drives based on the control arrangement used in the invention. In fact, they are done so in an alternative embodiment of the invention discussed below.

Figure 4:
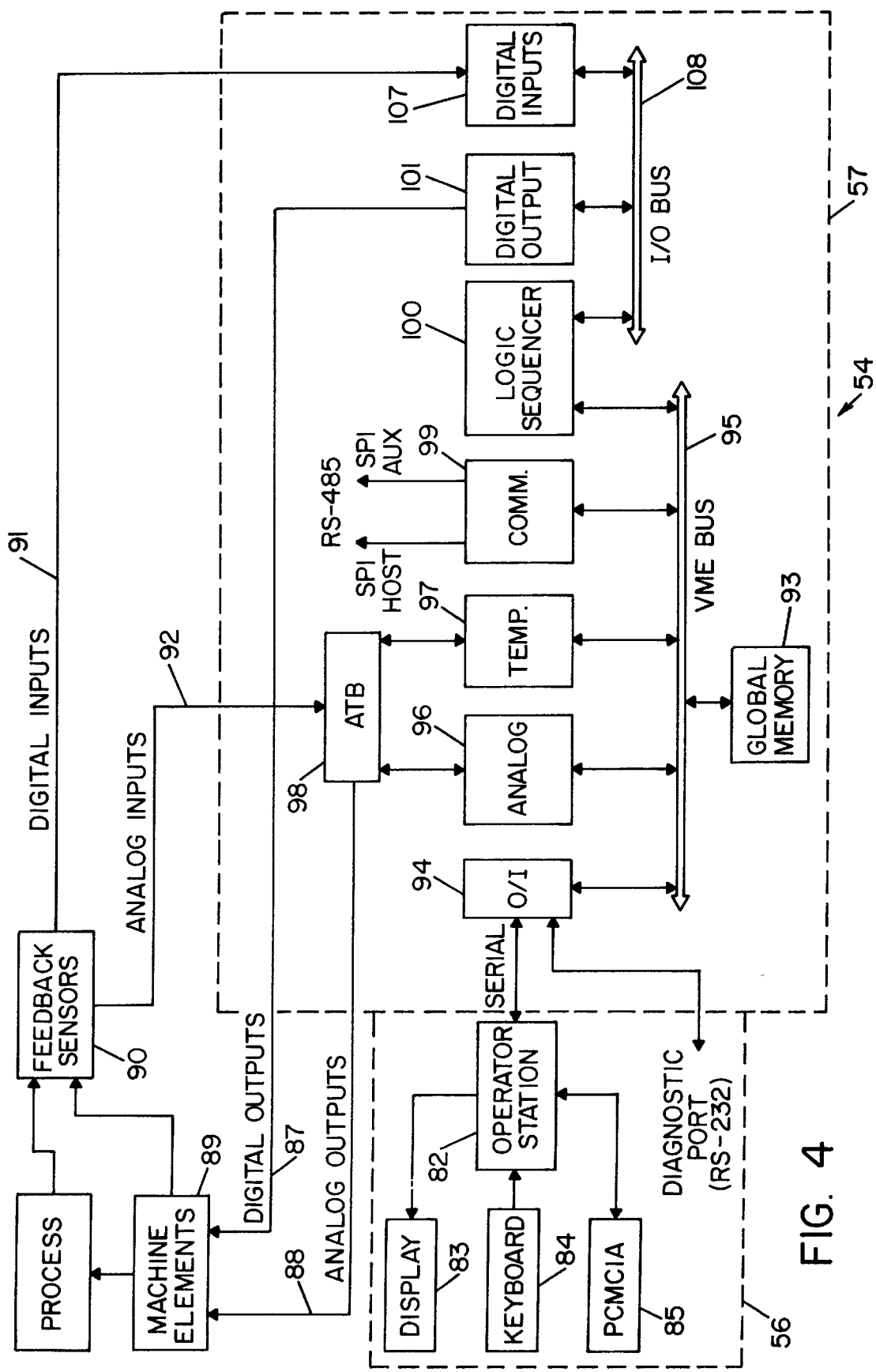
FIG. 4 is a schematic of the machine controller used in the present invention and can be viewed as prior art.

Referring now to FIG. 4, there is shown a general schematic of controller 54. In the preferred embodiment, controller 54 is the assignee's Pathfinder controller, specifically Pathfinder series 3000 or 5000. Operator station 56 includes an intelligent (CPU) operator station board 82 communicating with a display unit 83, a key board 84 in which the operator inputs mold cycle instructions and a PCMCIA slot 85 which is typically used to extract mold cycle run data for SPC, storage and other purposes. The communication with PCMCIA slot 85 is shown bi-directional with operator station board 82 so that mold cycle setting instructions can be inputted to the control as has been conventionally done with injection molding machines for some time. With a proliferation of windows based programs for statistical process control, and the increasing sophistication of molding shop end users, a generic PCMCIA slot is now generally provided at the injection molding machine's operator station. In addition, routines are stored in ROM and executed by RAM from the CPU in operator station board 82 to convert DOS based data instructions vis-a-vis PCMCIA slot 85 to machine instructions inputted to PLC 57. Currently, mold cycle run data is inputted only after a cycle has been completed, but it is contemplated that interaction with outside computers through PCMCIA slot 85 will allow modification of the mold cycle during any given run. Insofar as the invention is concerned, data is inputted either through key board 84 or PCMCIA slot 85 and the CPU in operator station board 82 converts this data into machine instructions which is sent to PLC 57 for processing. In addition, operator station board 82 receives machine data from PLC 57 and outputs it to PCMCIA slot 85 and/or to display 83 through a video signal display card under the control of the operator station CPU. The video display 83 also displays input data as well as output data.

The machine cycle signals are processed through PLC 57 which contains a number of boards, each of which is intelligent. Generally, PLC 57 sends out digital output signals on line 87 and analog output command signals on line 88 to a number of output devices such as valves, motors, pumps, solenoids, etc. shown by machine element block 89. The machines elements such as pistons 16, 32 and process sensors (such as pressure sensors within cavity 30) function also as feedback sensors shown by block 90 which can develop either digital feedback signals on line 91 or analog feedback signals on line 92 to PLC 57.

The principal boards within PLC 57 is an output/input board 94 communicating with operator station board 82 and with other system boards in PLC 57 through a VME bus 95 which, in turn, carries or accesses a global memory storage 93. Other boards include an analog processor board 96 and a temperature process board 97, both of which interface with an analog terminal board 98 receiving analog feedback inputs and generating analog outputs. PLC 57 also includes a communication board 99 carrying a processor allowing communication through SPI protocol with auxiliary devices connected to the injection molding machine such as robotic handling mechanisms. PLC 57 also includes a logic sequencer board 100 communicating not only with VME bus 95 but also with a digital output board 101 and a digital input board 107 through an input/output bus 108. Also, logic sequencer 100 has a high speed link (not shown) connected to analog board 96 for fast transmission of analog data simultaneously processed by analog board 96. Reference should be had to prior U.S. Pat. Nos. 5,493,503 and 5,456,870 which are incorporated by reference herein for a more detailed description and explanation of the workings of PLC 57 than that which will be described or set forth herein.

For the purposes of this invention, sequencer card 100 is the programmable controller containing the basic controls or programmable routines which control the molding cycle of the injection molding machine. Basically, sequencer card 100 uses a number of data generated by the other boards of the PLC including the user instructions vis-a-vis operator station 56 and performs a series of logic instructions which i) determines the value of certain sensor inputs, ii) performs logic and numeric calculations based on the sensor information which can be time or count dependent and iii) determines certain output signals based on the sensor inputs which control the molding cycle. This user defined program executed by sequencer board 100 must be periodically reviewed or scanned so that changes can be made to the output command signals and the molding cycle can sequence through its normal progression of events. Again, the patents incorporated by reference herein, U.S. Pat. Nos. 5,456,870; 5,493,503 and 5,513,115 disclose in greater detail than that set forth herein the state equations, predictive sensor techniques using finite impulse response filters etc. which assure that sequencer board 100 has performed the calculations necessary in a logic sequence and has inputted or caused the input of command output signals at the precise time that the output devices have to be performing the command function.

For purposes of this invention only, the output signals generated by controller 54 will be called "control" signals and those control signals which set the speed of the AC induction motors will be termed "command" signals so that command signals are a species of the broader control signals. The "input" signals to the sequencer card 100 include, as a species, "feedback" signals from the machine. As shown in FIG. 4, these include digital and analog feedback signals. Additionally input signals arise from the operator station 56, from other states within the control being executed etc. Certain "feedback" signals are designated "predictive sensor signals". Predictive sensor signals are used to generate command signals prior to the time the machine needs the output from the machine element actuated by the command signal.

Generally, sequencer card 100 divides the molding cycle into a number of "states" which can be viewed as corresponding to the phases of a molding cycle, i.e., clamp, inject, recover, eject. However, each molding cycle phase has any number of states. Each state contains any number of logic sequences or "normal" equations. The CPU in sequencer board 100 calls up the state's normal equations out of ROM and executes them in RAM and NVRAM in an ordered sequence or scan from start to finish. In the course of the scan, input signals are interpreted and control signals generated. When a specific, given input signal occurs the CPU transitions to another state. The normal equations in the first state are no longer read and the normal equations in the second state are being scanned. It should be apparent that by dividing the molding cycle into "small" states, the scan time is significantly reduced when compared to that which would be required if all the "normal" equations for the complete cycle had to be executed as is generally done in the injection molding art. Further any given state may be outputting a command signal so that in any given time thousands of command signals resulting from thousands of scans conducted during that given time will be outputted with each command signal based on a normal state equation. Instead of the motor being ramped to a given speed dictated by a set command signal, the motor speed is being changed by thousands of command signals occurring within milliseconds of one another so that motor is integrated "seamlessly" within the operating system of the machine. For AC rotate motor 45, this is an important consideration.

The truly unique aspect of Pathfinder's control is its feed forward technique. When a predictive sensor signal is detected in the scan, the CPU in sequencer board 100 calls out a second series of sequence instructions or equations. These second equations are based on or calculate the latency response of the control. For example, if a pump motor is idle in a first state and the first state is to transition to a second state whereat the pump must deliver full flow to the hydraulic actuator, the latency response time is the time from when the full flow instruction is given to the motor to drive the pump to the time the pump is able to provide full flow. The second set of equations basically determines at what time the command signal has to be inputted to the pump motor so that pump has full output and the command signal, an overriding signal, is in fact generated early so that when the control transitions to the second state the pump's full flow is present at the time the first scan calls for the pump command signal to be full flow.

This may, perhaps, be best explained by referring now to FIGS. 5 and 6 which have been duplicated from U.S. Pat. Nos. 5,493,503 and 5,513,115 and reference should be had to those patents for a more complete description of the state transition concepts and predictive signal techniques utilized herein. FIG. 5 illustrates the general and predictive signal concept employed in sequencer card 100 in which the molding cycle is performed by processing logic instructions in the direction of arrow 102 from a current state A 103 indicative of one step in the molding cycle to a state B 104 indicative of another step in the molding cycle. Generally speaking, the molding cycle starts in state A 103 and when an event is sensed, it switches to another state, state B 104. Depending on what happens in state B there are further transitions to a number of other states.

More particularly, while the machine is in state A there is an optional execution of state B wait block 105 which, essentially, is a fail safe concept preventing any actuation or transition from one state to another state until certain preset events have been detected. While the machine still remains in state A it is then processed to a state B preparatory block 106 which is triggered by predictive signals calculated vis-a-vis a second set of equations or logic instructions and which causes sequencer card 100 to move out of state A before the actual transition sensed by a feed-back sensor on the machine has occurred. When that feedback signal is actually generated, sequencer card 100 is already processing transition state B.

This can be better explained by reference to FIG. 6 which diagrammatically illustrates the mold clamp state A which is transitioning to injection step B and in the process, must also transition to steps indicated as break 110, clamp stop 111, core set 112 and slow clamp speed 113 (clamp 12 closes initially fast-then slow-then stop). Again, the prep blocks 106 are causing the actuation of command signals inputted to actuators in advance of the generation of the feedback signals indicative of the time at which an event occurs causing the machine to cycle from one state to another state. Predictive signals are generated to account for latency of the response of the actuator and include jitter.

Figure 2A:
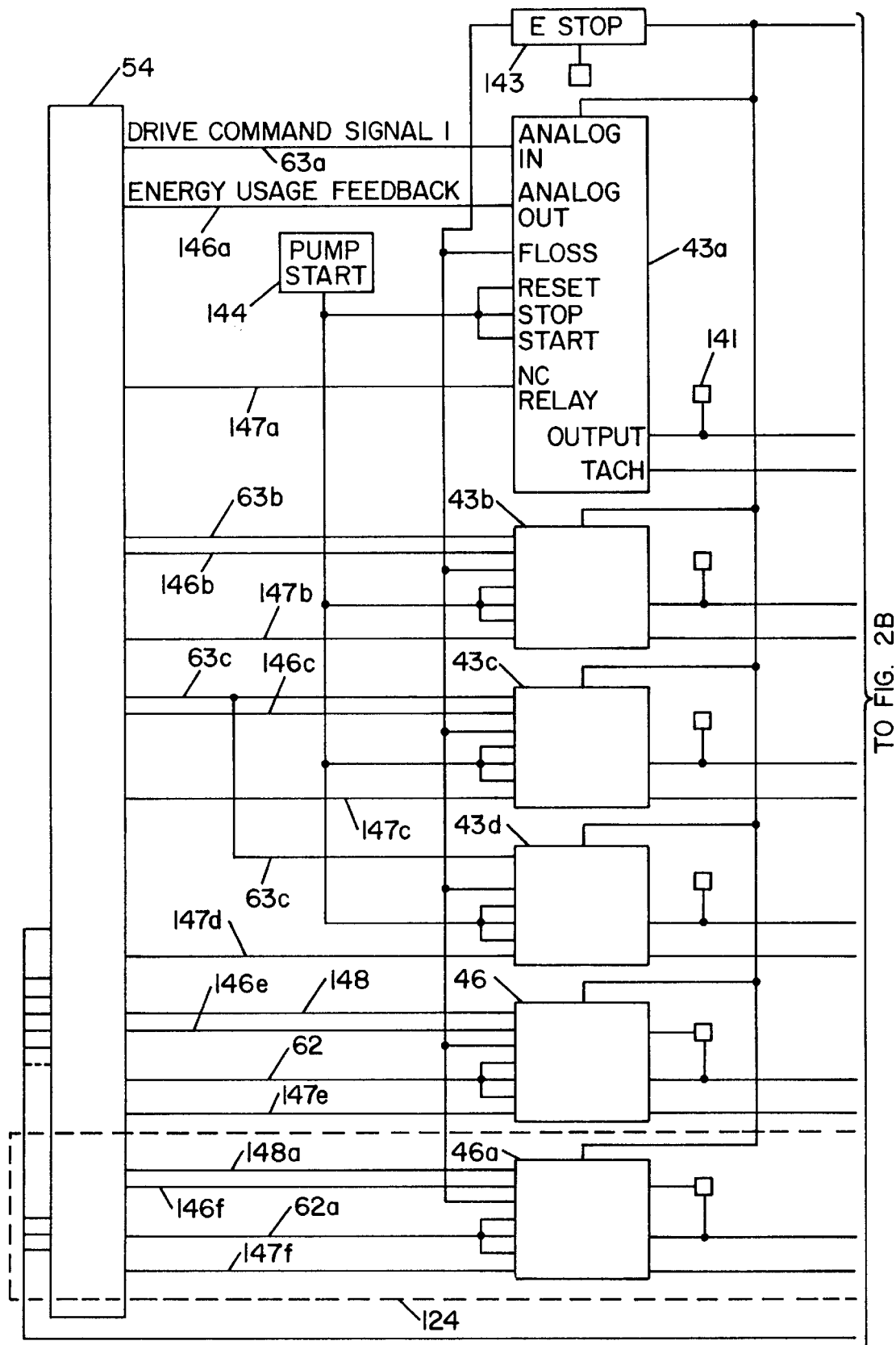
Figure 2B:
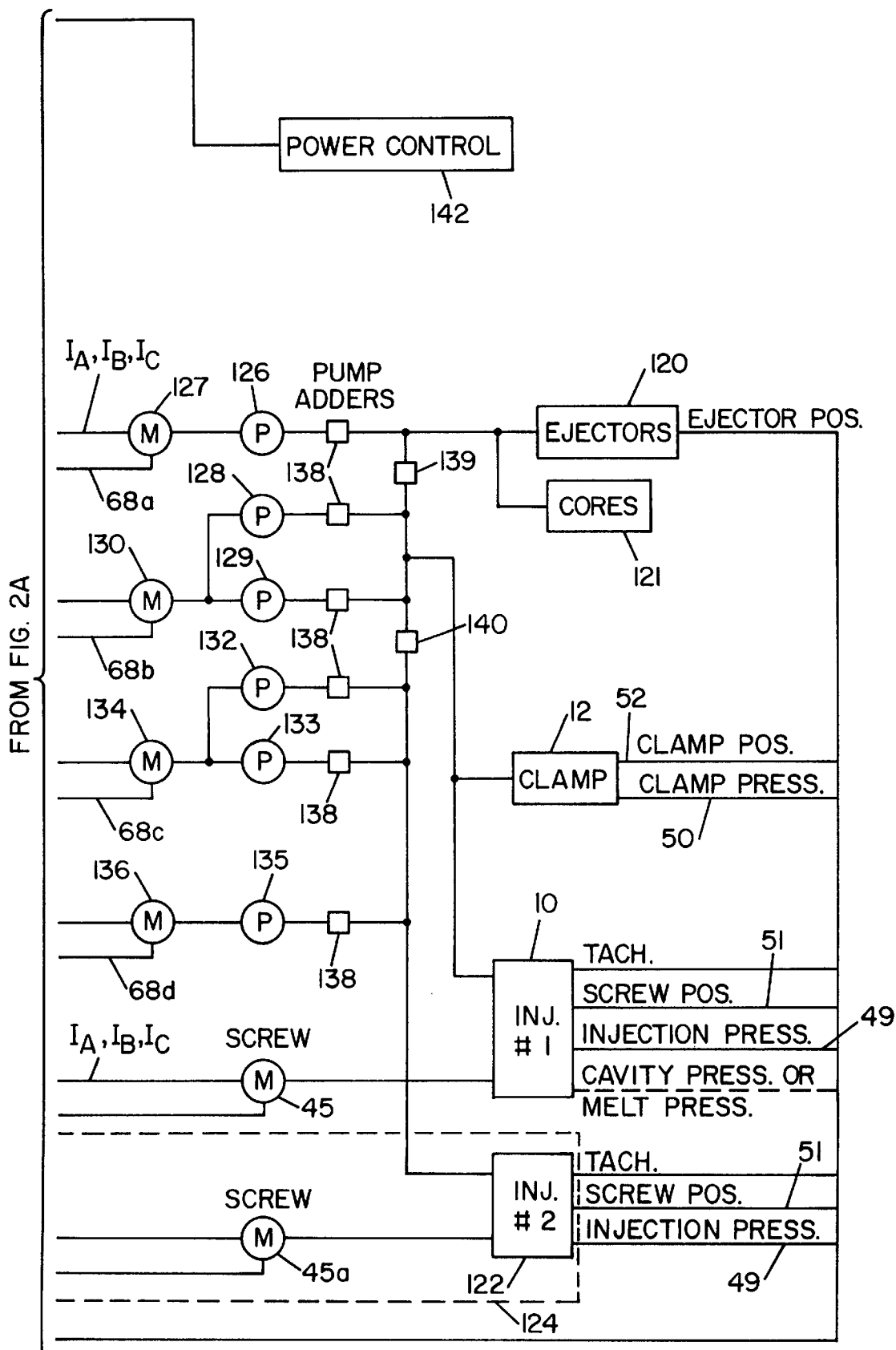

Referring now to FIG. 2 there is shown a schematic of a control diagram for a relatively large size injection molding machine. FIG. 2 is the preferred embodiment of the invention. In addition to injection unit 10 and the clamp mechanism 12 described with reference to FIG. 1, the machine has an ejector mechanism 120 and a core setting mechanism 121. Optionally, the machine is capable of coinjecting more than one type of molding material into the mold and to achieve the coinjection function an optional second injection unit 122 is provided and the optional drive therefor is contained within dashed envelope 124. There are six pumps provided for the hydraulic drives used in the machine driven by four AC induction motors. An ejector pump 126 is driven by an ejection motor 127. A first clamp pump 128 and a second clamp pump 129 is driven by a clamp motor 130. A first injection pump 132 and a second injection pump 133 is driven by an injection motor 134. Finally, the sixth pump, a coinjection pump 135, is driven by a coinjection motor 136. Each of the pumps has an adder 138 or a return to drain. The pumps are plumbed as shown and utilize a clamp divide circuit 139 and an inject divide circuit 140 which permits pump output from various pumps to be applied on demand to perform a given molding step. For example, to provide additional clamping capacity, power from ejector pump 126 can be added to the output of clamp pumps 128, 129. Each of the four pump electric motors have identical vector control drives discussed with reference to FIGS. 3 and 3A and are designated 43a, 43b, 43c and 43d.

A command drive signal 63a is developed by controller 54 as discussed with reference to FIGS. 5 and 6. In the preferred embodiment, the command signals are developed by assignee's Pathfinder control, specifically, the 3000 and 5000 series. As discussed, vector control 43a inputs through CRPWM inverter 74 three-phase drive currents $I_A$, $I_B$, $I_C$ to ejector motor 127 and pulse encoder 66 develops speed feedback signals on line 68a as shown. In the vector control block 43a additional inputs are shown which do not specifically control the vector drive and were not described in FIGS. 3 and 3A. Specifically, a snubber 141 is provided for breaking. A power circuit 142 is shown for providing power to the vector controls and the power circuit includes an emergency stop button 143 at operator station 56. Also provided is a manual pump start button 144 which interfaces with additional controls in vector drive 43a to insure ejector pump 126 is started synchronously with ejector motor 127 or is otherwise manually forced on. The additional controls added to the basic vector control schematic of FIG. 3 allows monitoring signals to be outputted to controller 54 for observation by the operator. Monitoring signals include an energy usage feedback signal on line 146a and a drive status feedback signal on line 147a. The arrangement described for vector control 43a variably driving ejector motor 127 in turn driving ejector pump 126 from a speed command signal 63a developed by controller 54 likewise applies to clamp vector control 43b, injection vector control 43c and co-injection vector control 43*d* and the same reference numerals with appropriate subscripts will likewise apply to each of these drive trains. Some additional points should be noted. Pump motors can, and customarily, drive more than one pump. The motor shaft is typically fitted to a gearbox which can have two or more output shafts driving two or more pumps. Alternatively, the motor shaft has one pump connected at one axial end and another pump connected at its opposite axial end. This is shown in FIG. 2 by clamp motor 130 engaging two pumps 128, 129 and injection motor 134 engaging two pumps 132, 133. These pumps are ganged through clamp divide and injection divide valves 139, 140 which may be viewed as "on-off" valves. In essence, the output of all six pumps can be used to perform any mold function or certain pumps can be selected to perform the function. Another point which should be noted in that the command signal 63*c* driving injection vector control 43*c* is also the command signal driving the co-injection vector control 43*d*. Injection unit 10 and co-injection unit 122 are often actuated simultaneously but not at the same rate. Thus, injection pumps 132, 133, 135 should be driven simultaneously vis-a-vis common command signal 63*c* but not at the same rate vis-a-vis proportioning valve (i.e., 35) which is not shown in the drive train arrangement of FIG. 2.

Screw vector control 46 driving recovery screw motor 45 is the same as vector control unit 46*a* driving coinjection recover screw motor 45*a* and is the same as that described for pump motor injection vector controls 43*a*, 43*b*, 43*c* and 43*d*. Screw vector control 46 uses the speed command signal 62 developed from controller 54 in the same manner as the speed command signals were used for the pump motor vector drives. In addition, controller 54 inputs a start/stop signal at line 148 to screw vector control 62. If the machine is fitted with shutoff valve 22, controller 54 would provide for actuation of shutoff valve 22 by solenoid 23 before the start signal on line 148 was inputted to vector control 46 so that vector controls 43*a* and 43*b* could be actuated to open the mold and eject the molded part while the machine was recovering melt for the next molding cycle. Like the pump motors, screw vector control 46 outputs monitoring signals indicating energy usage on line 146*e* and drive status on line 147*f*. Coinjection recovery screw motor 45*a* operates in the same manner as that described for recovery screw motor 45 but because of the different plastics which would be coinjected and the different amounts of plastic material injected, coinjection recovery screw motor 45*a* would operate at its own set speed and on/off cycle. The same reference numerals used to describe the drive train of recovery screw motor 45 will likewise apply with a different subscript to the drive train for co-injection recovery screw motor 45*a*.

The underpinning of the of the present invention is the recognition of factors which contribute or result to the problem which has to be resolved and then selecting or combining known solutions to resolve the problem. The problem in the present invention is to produce a general purpose all injection molding machine which has high energy efficiency but retains or improves functional performance of the machine. Functional performance of the machine was first reviewed by considering the characteristics of various drives at each step of the molding cycle. As discussed somewhat in the Background, that review shows that where linear motion or linear translation has to occur, there are inherent advantages to a hydraulic drive using hydraulic couplings. First, linear motion or translation is easily achieved through a hydraulic linear actuator, i.e., piston. In an electric drive, the rotary motion of the motor has to be converted to linear motion. This means that a hydraulic drive is preferred for injection and clamping functions but not for screw recovery nor necessarily for core setting or even ejection. Secondly, the translation speed of a hydraulic drive is simply quicker than that of an electric drive. This is generally shown by reference to FIG. 7 in which the velocity characteristics of the two drives are plotted as a function of time and are generally represented. The speed time curve 150 of a typical hydraulic drive through its hydraulic coupling and the speed time curve of a typical electric drive through its mechanical coupling is shown by the graph indicated by reference numeral 151. A comparison of the two curves indicates that an electric drive has a slightly faster acceleration on startup which is rapidly overtaken by the hydraulic drive. The speed at which the hydraulic drive overtakes the electric drive is significant and results in an overall faster speed producing shorter mold cycle times for the hydraulic drive. Finally, the hydraulic drive gives a direct feedback measurement of the force molding material experiences in the mold which can only be indirectly measured with the electric machine. The analysis is not as simple as that summarized. There is an inherent lag in fluid pressure build-up of a hydraulic drive. The electric drive instantaneously reacts, but is then limited by torque, drive friction, etc. The electric drive is somewhat linear and can be easily controlled not only during acceleration but also deceleration. Additionally, the motors are separately controlled whereas the hydraulic systems must sequence in additional pumps tending to provide disturbances. Such hydraulic drive limitations are significant. But for the state transition control methodology coupled with the feed forward control concepts in the Pathfinder control systems, such limitations in hydraulic drives would make a functional analysis of hydraulic and electric drives difficult. Because the Pathfinder control system addresses and corrects such limitations, the factors do not enter into consideration.

On the other hand, the screw recover function is ideally suited for an electric drive. First, the screw rotates so that the rotary motion of the electric motor can be directly coupled to the screw whereas the hydraulic drive requires a relatively expensive hydraulic motor to produce the rotation. The linear speed of the screw is not a factor in the recovery step. In fact, the only control in the recovery step is the rotational speed of the screw which can be easily directly sensed and controlled in an electric drive as discussed above. Finally, since a separate electric motor powers the screw, the screw can plasticize resin while other machine operations, such as clamp motion or ejection occur and it does so without compromising the integrity of the other machine functions. When this is accomplished on conventional machines using hydraulic drives, it is referred to as "continuous screw rotate". For an all hydraulic machine to "continuous screw rotate" additional hydraulic circuits with additional motors and pumps must be added making the machine less energy efficient while significantly increasing the cost of the drive.

In summary of the functional analysis, the clamp and injection functions should be performed by a hydraulic drive and the screw recovery function should be performed by an electric drive.

Consideration then turns to the energy efficiency characteristics of a machine equipped with such drives. In this regard, it must be noted that performing screw recovery with an electric drive in and of itself and without anything more reduces energy operating costs compared to an all hydraulic drive machine especially when "continuous screw rotate" is to be performed. Apart from this, the energy usage of the hydraulic drive itself is improved by variably controlling the speed of the motors driving the pumps. In this regard, the invention uses the AC induction, squirrel cage, motor. This motor is considerably less expensive than DC, DC brushless and AC synchronous motors and is ideal for high horsepower, high torque applications such as present in general purpose injection molding machines. The high torque present at any speed of the motor means that the pump always delivers fluid under high pressure permitting the system to be regulated by flow control. The vector control under discussion (which in the preferred embodiment is a general purpose AC drive marketed by the Reliance Electric Company under its model designation GV3000) will timely control the speed of the induction motor for the applications under discussion in accordance with the command signal developed by controller 54. That is the response time of the drive to generate the speed desired is sufficiently quick (in inner closed loop form) to be programmed into the control.

In this connection, reference should again be had to FIG. 1 to understand that the schematic illustrated therein is somewhat typical of a small injection molding machine. In accordance with the FIG. 1 schematic, it can be reasonably concluded that if pump 38 was not supplying fluid to clamp mechanism 12, pump 38 would be supplying fluid to injection mechanism 10 simply because this is the manner in which the molding cycle sequences. Thus, during the course of the molding cycle, pump 38 is idle for some time but perhaps not a very significant time. The energy saving usages thus occurs in the FIG. 1 schematic for controlling the speed of motor 38 from one high speed to a lesser high speed but not necessarily to idle. In reality, the machine to which the invention is applied, is the preferred embodiment represented by the control schematic of FIG. 2 which shows six pumps driven by four motors which are plumbed or mated together in a hydraulic system which combines a multitude of the pump outlets to supply pressure and flow on demand. In this arrangement, a number of the motors are idle during portions of the molding cycle. It is in this application where the Pathfinder controller with its state transition methodology triggered by predictive sensor signals affords the invention a clear advantage over prior art variably controlled motor arrangements. Specifically, the predictive sensors allow the motors to run at very low speeds during idle because sufficient advance time is built into the system to allow for the motor to increase to its demand speed and further, the demand speed can be more closely controlled by the use of predictive sensor signals during each molding step. In the preferred embodiment the Pathfinder control is programmed to reduce motor idle speed to about 160 RPM which is about ten percent (10%) of conventional speed. While motor speeds could be lowered to as little as single digit RPM, pump vane considerations dictate a higher speed so that the pump can build on demand sufficient pump flow and pressure to satisfy machine demands.

The efficiency of the machine is shown in FIG. 8. FIG. 8 is a series of bar graphs showing energy usage in watts per cycle during the molding cycle used by three different, medium sized machines processing the same gram shots. For each molding step or function the bar graph at the left represented by reference numeral 152 is the energy usage of an all hydraulic machine. The middle bar graph indicated by reference numeral 153 is the hybrid machine of the present invention and the bar graph at the right of the cluster indicated by reference numeral 154 is the energy usage of an all electric machine. FIG. 8 dramatically illustrates reduction in energy achieved by use of an electric screw drive for screw recovery.

The basis of an alternative embodiment of the invention is illustrated in FIG. 9. In the preferred embodiment and in the commercial embodiment of the invention, conventional flow control proportioning valves 35, 36 are used for the injection and mold clamping function and, in addition, a proportioning valve is also used for the ejection/core setting steps of the cycle. Since the motor speed is variably adjusted by the vector drive, tests were conducted without a proportioning valve. The graphs shown in FIG. 9 depict the results of a diffusion boost test. That is, and without a proportioning valve present, the screw is translating at some velocity and then boosted in velocity for some set distance and then returned to its initial velocity. This is what occurs during velocity profiling. The graphs were generated for FIG. 9 by boosting the velocity of the screw when the screw had reached 1.5 inches of travel and then stopping the boosted pressure at 3 inches of travel. The graph passing through circles designated by reference numeral 158 was performed with the AC induction motor simply under conventional control. In fact, graph 158 was generated with the Reliance GV3000 drive operating in its general purpose or volts per hertz mode. The graph passing through triangles indicated by reference numeral 159 shows the boost velocity with the vector control drive illustrated in FIGS. 3 and 3A which use speed feedback from pulse encoder 66 to generate the flux components. The vector control curve 159 shows an ability to reach and maintain the set velocity which is not possible with the open control valve represented by curve 158. FIG. 9 thus indicates that with a conventional proportioning valve the vector control is better able to control the flow and pressure on demand than other controls because it requires less activation of the proportioning valve or a more responsive system than what otherwise might be required. Insofar as the alternative embodiment is concerned, the Pathfinder control with its state transition/predictive finite impulse response filtering technique is able to adjust for the response latency of the vector control represented by the time it took for the screw to travel from the 1.5 inch distance to the 2.0 inch distance so that, in this respect, demand requirements of the system can be met in a system lacking a proportioning valve. However, the decrease in velocity of both curves 159, 158 is not acceptable. While the vector control curve 159 exhibited better performance than the general purpose control during deceleration, both controls induced cavitation in the pump during deceleration. This was improved for the vector control by substitution of a "meter out" valve, i.e., a fixed orifice valve. With the meter out valve in place, deceleration could be controlled to prevent cavitation and resulted in deceleration curve indicated by dashed line segment 160. It is believed that utilizing the control techniques (with, optionally, a feedback loop for the controller command signal) with a fixed metering valve for deceleration can result in a hydraulic system for at least one of the pump applications without a proportioning valve.

A further alternative embodiment of the invention applied to the pump motor is that encoderless or stepless induction motor drives can be utilized provided that the control signals for valves 35, 36 are adjusted for compensation. When a command signal is inputted to the vector drive, the drive instantaneously responds but it takes some time to build motor speed to command speed. If that time is longer than the time required by the machine for the molding phase, the control is simply not acceptable. The response time by present day encoderless drives is longer than that required to bring the motor up to command speed or to change command speeds than with closed loop vector drives. However, the response time of valves 35, 36 can be varied to account for this long delay and the total response time of valve/pump/motor built into predictive signals for state transition.

The invention has been described with reference to a preferred embodiment and to alternative embodiments. Modifications and alterations will occur to those skilled in the art upon reading and understanding the detailed description of the invention set forth herein. It is intended to include all such modifications and alterations insofar as they come within the scope of the invention.

What is claimed is:

1. An energy conserving hybrid injection molding machine comprising:

an injection unit for injecting molding material into the mold cavity of a mold, said injection unit including a screw member rotatably and translatably carried in a tubular barrel, said barrel having an end in fluid communication with said mold cavity;

a first drive unit coupled to said injection unit for rotating said screw in said barrel; said first drive unit including a first AC induction motor, a mechanical coupling connecting said first AC induction motor with said screw and a vector control drive for controlling the operation of said first AC motor pursuant to a variable rotate command signal;

a second drive unit coupled to said injection unit for translating said screw in said barrel; said second drive unit including a second AC induction motor, a hydraulic constant delivery pump driven by said second AC induction motor, a first hydraulic coupling between said pump and said screw for translatably moving said screw within said barrel and a second vector control drive for variably controlling the speed of said second AC induction motor pursuant to a variable injection command signal;

a machine controller for generating said command signals to cause said molding machine to perform a given molding cycle, said machine controller including motor speed sensors measuring the speed of said first and second AC motors; and, said vector control drive for each motor including means for calculating maximum torque and flux current components passing through stator windings only from a speed signal comparing a motor speed signal with a set command speed signal whereby the torque produced by the AC motors is not used to control the motors.

2. The machine of claim 1 further including a clamp unit for supporting first and second sections of a mold selectively movable from a first parted position in which said mold sections are opened to a second molded position in which the mold sections are closed to define said mold cavity therebetween;

said second drive unit further including a second hydraulic coupling operable to move said clamp between said first and second positions and maintaining said clamp in said second position at a set force; said second vector control drive further effective to vary the speed of said second AC motor pursuant to a variable clamp command signal generated by said machine controller.

3. The machine of claim 1 wherein said first hydraulic coupling includes a fixed valve metering said fluid from said pump to cause said translation whereby only said speed of said motor controlled by the second drive unit causes said screw to variably translate in said board.

4. The machine of claim 1 wherein said first hydraulic coupling includes a proportioning valve for metering said fluid from said pump in response to valve signals generated by said controller in addition to said command signals; said controller including predictive signal means causing the generation of said valve signals at an advanced time period equal to the response latency period of the second vector drive unit, said second vector drive being an encoderless drive.

5. An energy conserving hybrid injection molding machine comprising:

an injection unit for injecting molding material into the mold cavity of a mold, said injection unit including a screw member rotatably and translatably carried in a tubular barrel, said barrel having an end in fluid communication with said mold cavity;

a first drive unit coupled to said injection unit for rotating said screw in said barrel; said first drive unit including a first AC induction motor, a mechanical coupling connecting said first AC induction motor with said screw and a vector control drive for controlling the operation of said first AC motor pursuant to a variable rotate command signal;

a second drive unit coupled to said injection unit for translating said screw in said barrel; said second drive unit including a second AC induction motor, a hydraulic pump driven by said second AC induction motor, a first hydraulic coupling between said pump and said screw for translatably moving said screw within said barrel and a second vector control drive for variably controlling the speed of said second AC induction motor pursuant to a variable injection command signal;

a clamp unit for supporting first and second sections of a mold selectively movable from a first parted position in which said mold sections are closed to define said mold cavity therebetween;

said second drive unit further including a second hydraulic coupling operable to move said clamp between said first and second positions and maintaining said clamp in said second position at a set force; said second vector control drive further effective to vary the speed of said second AC motor pursuant to a variable pump command signal;

said second drive unit includes a third AC motor, a second pump driven by said third motor, and a third vector control drive for driving said third AC motor; and, machine controller means for generating said command signals to cause said molding machine to perform a given molding cycle.

6. The machine of claim 5 wherein said second drive unit further includes proportioning valves downstream of said pump and upstream of said hydraulic coupling responsive to control signals generated by said controller to control flow of hydraulic fluid to said hydraulic couplings and said pumps being constant delivery pumps.

7. The machine of claim 6 wherein said machine includes sensors developing feedback signals indicative of a machine process state; said machine controller includes state transition means for developing variable control signals upon a sensed change in state of said feedback signals to sequence said machine through the phases of a given molding cycle and predictive signal means causing said command signals to be initiated in advance of the transition to a successive phase whereat said command signals controlling said motors are changed in advance of the time said motor's operation is to be changed in said molding cycle.

8. The machine of claim 7 wherein each state in said state transition means processes a normal set of logic sequences and said predictive signal means for said second and third motors processes a second set of logic sequences predictive of the latent response time of said motors to attain an operating condition equal to that set by said command signal.

9. The machine of claim 8 wherein one of said sensors measures the rotational speed and position of said screw to generate rotational speed feedback control signals to said controller, said state transition means effective to adjust a rotate command signal by the difference between said feedback rotational speed and the command speed in said normal set of state equations and said predictive signal means for said first motor utilizing said position control signals in said second set of logic sequences to cause a change in state for said first motor to occur in advance of said screw reaching a position whereat its speed is to be varied.

10. The machine of claim 9 wherein each vector control drive includes means for calculating torque and flux components of current passing through stator windings of the motor controlled by the vector drive in response to said command signals and an inverter for producing pulse width modulated trigger signals to drive said motor based on said calculated torque and flux components.

11. The machine of claim 10 wherein said command signals are velocity signals and said means for calculating torque and flux current components for said first motor further includes an encoder for sensing rotor position and generating motor speeds which are compared to said command signals in a closed loop.

12. The machine of claim 11 further including a shut-off valve between said screw and said mold sections and said controller operating said shut off valve to permit simultaneous rotation of said screw during the recover step of the molding cycle while said mold is opening to permit ejection of the molder part.

13. The machine of claim 11 wherein one of said sensors is a screw transducer for generating screw pressure feedback signals indicative of fluid pressure exerted by said pump on said screw and said machine controller interpolating said screw pressure feedback signals to generate an injection command signal inputted to said second vector control drive unit.

14. The machine of claim 13 wherein one of said sensors includes a clamp transducer for generating clamp feedback signals indicative of fluid pressure exerted by said second pump on said clamp and said machine controller interpolating said clamp feedback signals to generate a clamp command signal inputted to said third vector control drive.

15. The machine of claim 14 wherein said second and third AC motors lack an encoder and said second predictive signal means includes sequence equations affecting the timing of said control signals regulating the operation of said valve means associated with said second and third motors.

16. The machine of claim 15 further including an ejector for removing cores from said mold after injection; said second drive unit further including a fourth AC motor, a third pump driven by said fourth AC motor and a fourth vector control drive for driving said fourth AC motor.

17. An injection molding machine comprising:
a) an injection unit for injecting molding material into the mold cavity of a mold by causing a screw to linearly move within a tubular barrel; said injection unit including a first AC induction motor, a constant delivery pump connected to said first AC motor, a first hydraulic coupling directing pump fluid at a set pressure and flow to control movement of said screw in said barrel and a first vector drive for variably controlling the speed of said first motor in accordance with a first inject command signal;

b) a clamp unit for opening and closing said mold; said clamp unit including a second AC induction motor, a second constant delivery pump connected to said second motor, a second hydraulic coupling directing pump fluid at a set pressure and flow to control opening, closing and clamping of said mold; and a second vector control drive controlling the speed of said second AC induction motor in accordance with a second clamp command signal;

c) an ejector unit for ejecting the finished molded part from said mold and for setting cores into said mold cavity; said ejector unit including a third AC induction motor, a third constant delivery pump connected to said third motor, a third hydraulic coupling directing pump fluid at a set pressure and flow to cause ejection of said part and thereafter setting of said core; and a third vector control means for variably controlling the speed of said third AC motor in accordance with a third eject command signal;

d) a screw recover unit for rotating said screw, said screw recover unit including a fourth AC induction motor, a mechanical coupling causing rotation of said screw; and a fourth vector control for variably controlling the speed of said fourth in accordance with a fourth AC induction motor rotate command signal; and, e) a controller for generating said first, second, third, and fourth command signals.

18. The injection molding machine of claim 17 wherein each of said first, second and third hydraulic couplings includes a proportioning valve controlling the pressure and flow of fluid from each's respective pumps in accordance with valve control signals, said controller generating said valve control signals in addition to said first, second, third and fourth command signals.

19. The machine of claim 18 wherein said controller causes said machine to actuate said injection unit, clamp unit, rotate unit and eject unit in a set molding cycle sequence by sequentially executing a plurality of states each state containing a plurality of logic instructions generating variable control and command signals.

20. The machine of claim 19 wherein said controller further includes predictive signal means for causing any given actuated state to transition to a successive state in advance of the time of occurrence of a state transition triggering event whereby the response latency of the pump to deliver fluid at a given pressure and flow is accounted for.

21. The machine of claim 20 wherein said command signals are speed signals and each vector control drive includes means for calculating torque and flux components of current passing through stator windings of the motor controlled by said vector control drive based on said command signals and an inverter for producing pulse width modulated trigger signals to drive said motor based on said calculated torque and flux components.

* * * * *